(12) United States Patent
Jeong et al.

(10) Patent No.: US 8,934,900 B2
(45) Date of Patent: Jan. 13, 2015

(54) METHOD AND APPARATUS FOR ALLOWING USER EQUIPMENT TO DETERMINE VALIDITY OF SYSTEM INFORMATION BEFORE RECEIVING THE SAME IN A NETWORK SHARING SYSTEM

(75) Inventors: Kyeong-In Jeong, Suwon-si (KR); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 2591 days.

(21) Appl. No.: 11/340,854

(22) Filed: Jan. 27, 2006

(65) Prior Publication Data

US 2006/0166693 A1     Jul. 27, 2006

(30) Foreign Application Priority Data

Jan. 27, 2005   (KR) .................. 10-2005-0009765

(51) Int. Cl.
    *H04W 36/00*        (2009.01)
    *H04W 48/16*        (2009.01)

(52) U.S. Cl.
    CPC .......... *H04W 48/16* (2013.01); *H04W 36/0055* (2013.01)
    USPC ........................................ 455/436; 370/338

(58) Field of Classification Search
    USPC .......................................... 455/433; 370/338
    See application file for complete search history.

(56) References Cited

U.S. PATENT DOCUMENTS

2004/0053626 A1 *  3/2004   Yagi ........................... 455/456.1
2005/0213566 A1 *  9/2005   Jutila et al. .................... 370/352

FOREIGN PATENT DOCUMENTS

| GB | 2 381 414 | 4/2003 |
|---|---|---|
| KR | 2005-0116547 | 12/2005 |
| WO | WO 00/72609 | 11/2000 |

OTHER PUBLICATIONS

Anonymous, "3GPP TS 23.331 V6.4.0", Dec. 2004, pp. 43-52 and 469-471.

* cited by examiner

*Primary Examiner* — Marcos Batista
(74) *Attorney, Agent, or Firm* — Roylance, Abrams, Berdo & Goodman, L.L.P.

(57) ABSTRACT

A method and apparatus are provided for receiving system information during inter-cell movement of a user equipment (UE) in a network sharing (NS) system. The UE moves from a previous cell to a new cell. After the movement, the UE compares a public land mobile network (PLMN) identity indicating a PLMN to which the previous cell belongs, with a PLMN identity indicating a PLMN to which the new cell belongs. If the PLMN identity of the new cell is equal to the PLMN identity of the previous cell, the UE sets system information blocks that it has received and stored in the previous cell, as system information of the new cell. If the PLMN identity of the new cell is not equal to the PLMN identity of the previous cell, the UE receives system information blocks with 'Area scopes Cell and PLMN' from the new cell, considering that the system information for the previous cell will be invalid in the new cell.

10 Claims, 6 Drawing Sheets

FIG.1
(CONVENTIONAL)

FIG.6 ized with Public Land Mobile
METHOD AND APPARATUS FOR ALLOWING USER EQUIPMENT TO DETERMINE VALIDITY OF SYSTEM INFORMATION BEFORE RECEIVING THE SAME IN A NETWORK SHARING SYSTEM

CROSS-REFERENCE TO RELATED APPLICATIONS

This application claims the benefit under 35 U.S.C. §119(a) of a Korean Patent Application Serial No. 2005-9765 filed in the Korean Intellectual Property Office on Jan. 27, 2005, the entire contents of which are hereby incorporated by reference.

BACKGROUND OF THE INVENTION

1. Field of the Invention

The present invention relates generally to a network sharing (NS) system. In particular, the present invention relates to a method and apparatus for allowing a user equipment (UE) to determine validity of broadcast system information before receiving the system information.

2. Description of the Related Art

A mobile communication system includes radio access networks (RANs) and user equipments (UEs). Each of the RANs includes Node Bs (or base stations), and is connected to another network via a core network (CN). RANs that use different radio access technologies or are managed by different CN operators can be connected to a plurality of CNs managed by the same CN operator or different CN operators. Herein, a technique in which different CN operators share an RAN with each other is called "network sharing (NS)."

Specifically, an RAN for a cellular mobile communication system that follows the 3$^{rd}$ Generation Partnership Project 2 (3GPP2) standard (the content of the standard are hereby incorporated by reference) and uses a Code Division Multiple Access (CDMA) technology, includes a base transceiver subsystem (BTS) and a base station controller (BSC), and is connected to a CN via a mobile switching center (MSC). In another case, an RAN for a Wideband CDMA (WCDMA) system, that is a Universal Mobile Telecommunications System (UMTS) system that follows the 3GPP standard and is based on Global System for Mobile Communications (GSM) and General Packet Radio Service (GPRS), includes a cell, a Node B and a radio network controller (RNC), and is connected to a CN that includes a Serving GPRS Support Node (SGSN).

The CN operators are identified with Public Land Mobile Network (PLMN) identities (PLMN ids), and the PLMN id is created with a combination of a Mobile Country Code (MCC) and a Mobile Network Code (MNC). A UE selects a PLMN indicating an appropriate CN operator under the control of the network or spontaneously. In order to access the selected CN operator, the UE reports a PLMN identity indicating the selected PLMN to the RAN.

Figure 1:
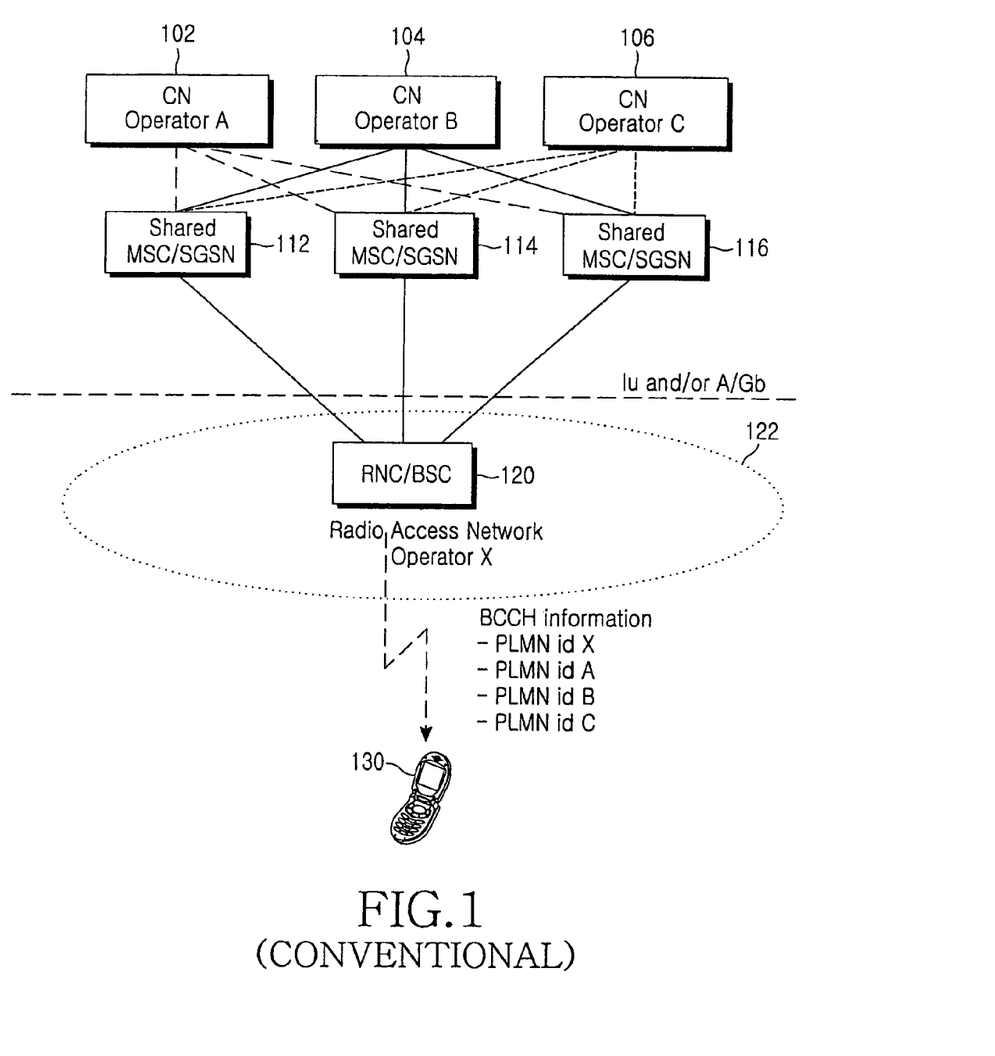
FIG. 1 is a diagram illustrating an NS configuration in 3GPP.

FIG. 1 is a diagram illustrating an NS configuration in which different CN operators share a RAN with each other.

An RAN 120 covering a cell 122, which is a specific service area, includes an RNC or a BSC and is connected to CN nodes 112, 114 and 116, each of which includes an MSC or an SGSN, via an Iu interface and/or A/Gb interface.

Different CN operators A 102, B 104 and C 106 share the CN nodes (MSC/SGSN) 112, 114 and 116, and the RAN 120 belongs to a CN operator X and is shared by the CN operators A 102, B 104 and C 106. The shared RAN 120 transmits PLMN ids, i.e., a multiple PLMN list, indicating the CN operators A 102, B 104 and C 106 that share the cell 122, as well as the CN operator X belonging to the cell 122, using system information that is broadcast to a UE 130 through a broadcast control channel (BCCH) exiting in the cell 122. The UE 130 selects an appropriate PLMN id based on the system information or by an Access Stratum (AS) layer or a Non-Access Stratum (NAS) layer. The AS layer covers a protocol related to a Uu interface between the RNC and the UE, and the NAS layer, which is an upper layer of the AS layer, covers a protocol related to an interface between the UE and the CN.

The UE 130 communicates with the RAN 120 using a radio resource control (RRC) protocol, and the term "RRC message" as used herein refers to a message exchanged between the UE 130 and the RAN 120.

The typical 3GPP system broadcasts the commonly required information to UEs in the cell, and the information broadcast over a common channel is called "system information." Commonly, a UE updates the system information when it enters a new cell or enters a new PLMN area. However, in the NS system, the new cell the UE enters may be shared by a plurality of CN operators. In this case, the UE may perform an unnecessary operation of receiving system information in the new cell, even though the new cell uses the same system information as that of the previous cell.

SUMMARY OF THE INVENTION

One aspect of the present invention addresses the foregoing problems by providing a method and apparatus for inter-cell movement of a UE in an NS system.

Another aspect of the present invention is to provide a method and apparatus for allowing a UE to determine validity of broadcast system information before receiving the system information in an NS system.

According to one exemplary aspect of the present invention, there is provided a method for receiving system information during inter-cell movement of a user equipment (UE) in a network sharing (NS) system. The method comprises moving, by a UE, from a previous cell to a new cell, and comparing a public land mobile network (PLMN) identity indicating a PLMN to which the previous cell belongs, with a PLMN identity indicating a PLMN to which the new cell belongs. If the PLMN identity of the new cell is equal to the PLMN identity of the previous cell, system information blocks that the UE has received and stored in the previous cell are set as system information of the new cell. If the PLMN identity of the new cell is not equal to the PLMN identity of the previous cell, system information blocks with 'Area scopes Cell and PLMN' are received from the new cell, considering that the system information for the previous cell will be invalid in the new cell.

According to another exemplary aspect of the present invention, there is provided a network sharing (NS) system comprising user equipment (UE) and at least one radio access network (RAN) for covering a plurality of cells, and broadcasting a public land mobile network (PLMN) identity indicating a PLMN to which each cell belongs and a multiple PLMN list indicating PLMNs sharing each cell, through each cell. If the UE moves from a previous cell, which is one of the plurality of cells, to a new cell, UE compares a PLMN identity of the previous cell with a PLMN identity of the new cell. If the PLMN identity of the new cell is equal to the PLMN identity of the previous cell, system information blocks that the UE has received and stored in the previous cell are set as system information for the new cell. If the PLMN identity of the new cell is not equal to the PLMN identity of the previous cell, system information blocks with 'Area scopes Cell and PLMN' are received from the new cell, considering that the system information of the previous cell is invalid in the new cell.

BRIEF DESCRIPTION OF THE DRAWINGS

The above and other objects, features and advantages of the present invention will become more apparent from the following detailed description when taken in conjunction with the accompanying drawings in which like reference numerals will be understood to refer to like parts, components and structures, where.

DETAILED DESCRIPTION OF EXEMPLARY EMBODIMENTS

Certain exemplary embodiments of the present invention will now be described in detail with reference to the annexed drawings. In the following description, a detailed description of known functions and configurations incorporated herein has been omitted for clarity and conciseness.

A description will now be made of system information applied to an exemplary embodiment of the present invention.

Table 1 shows master system information in the system information, which can be transmitted in the NS system scenario of FIG. 1.

TABLE 1

| Information Element/Group name | Need | Type and reference | Example value for the FIG. 1 | Version |
|---|---|---|---|---|
| Other information elements | | | | |
| MIB Value tag | MP | Integer (1 ... 8) | One of value among Integer (1 ... 8) | |
| CN information elements | | | | |
| Supported PLMN types | MP | Enum (GSM-MAP, ANSI-41, GSM-MAP and ANSI-41) | Set as GSM-MAP | |
| PLMN Identity | CV-GSM | PLMN identity | PLMN X | |
| Multiple PLMN List | OP | Multiple PLMN List | PLMN A PLMN B PLMN C | REL-6 |
| ANSI-41 information elements | | | | |
| ANSI-41 Core Network Information | CV-ANSI-41 | ANSI-41 Core Network Information | | |
| References to other system information blocks and scheduling blocks | MP | References to other system information blocks and scheduling blocks | | |

In Table 1, "Need" represents a need for a corresponding information element (IE), and can have one of Mandatory (MP), Optional (OP) and Conditional (CV) values. The MP indicates that the corresponding information element should be mandatorily included, the OP indicates that the corresponding information element can be optionally included or not included, and the CV indicates that the corresponding information element can be included or not included according to a set value of other information elements. "Example value for the FIG. 1" represents exemplary information elements available for a cell 122 in FIG. 1. "Version" represents Release (REL) of the corresponding information element, and for example, REL-6 represents information for the UEs that support the REL-6 3GPP standard or higher standards. A UE that supports only the standards lower (earlier) than the REL-6 standard cannot analyze the REL-6 information elements.

"MIB (Master Information Block) Value tag" represents a version of the master system information. A change in the system information increases the version value of the master system information. A UE checks the change/non-change in the system information depending on the version value, and based on the check result, receives the system information or uses the system information previously stored therein instead of receiving the new system information. For example, the version value has an integer ranging from 1 to 8.

CN information elements included in the master system information will now be described below. "Supported PLMN types" represents a type of the system. For example, it represents any one of or both of GSM-MAP and ANSI-41 networks. "PLMN identity" represents a CN operator, i.e., a PLMN, having a RAN to which the current cell is connected, and has a PLMN X in FIG. 1. "Multiple PLMN List," which is an optional information element, represents the PLMNs that share the RAN to which the current cell is connected, and can have a plurality of values. In FIG. 1, Multiple PLMN List of the cell 122 has PLMN A, PLMN B and PLMN C. A description of ANSI-41 information elements will be omitted for clarity and conciseness.

Broadcast system information includes the master system information, scheduling system information, and a plurality of system information blocks. The master system information, the scheduling system information, and the system information blocks include a version value, and inform a UE of a change in the corresponding system information. A change in any one of the scheduling system information and each of the system information blocks increases a version value of the changed system information and master system information. The UE can detect the change/non-change in the system information depending on the version value of the master system information, and receive the changed system information upon detecting the change in any system information through the version value of the changed system information. If no version value is changed, it means that the scheduling system information and each of the system information blocks are not changed. In this case, the UE is not required to receive the system information, and uses the previously received system information.

The master system information, the scheduling information and the system information blocks may have different area scopes for the corresponding version value. The term "area scope" refers to a scope in which the version value is valid. For example, for a system information block having an 'Area scope Cell', the UE is not required to receive the system information block again unless the version value is changed in one cell. However, if the UE leaves the cell, that s if the UE selects a new cell and moves thereto, it receives the system information block broadcast in the new cell, considering that the previous system information block having the 'Area scope Cell' is no longer valid regardless of the version value, and deletes (clears) the system information block previously stored therein and updates the system information block with the received system information block with 'Area scope Cell'.

In addition to the 'Area scope Cell', the system information like system information block 1 may have an 'Area scope PLMN'. If the UE selects movement to a new cell belonging to a new PLMN, it receives and stores a system information blocks from the new cell and uses it in a new cell, assuming that the current system information (including a master system information block, scheduling information blocks and system information blocks) having an 'Area scopes Cell and PLMN' is no longer valid. If the UE has system information previously stored in the new PLMN and a version value of the stored system information is equal to a version value of the system information of the new cell, the UE reuses the previously stored system information blocks without the need to receive all system information blocks of the new cell. Table 2 shows version values for system information blocks and their area scopes.

TABLE 2

| System information block | Area scope | Modification of system information |
|---|---|---|
| Master information block | Cell | Value tag |
| Scheduling block 1 | Cell | Value tag |
| Scheduling block 2 | Cell | Value tag |
| System information block type 1 | PLMN | Value tag |
| System information block type 2 | Cell | Value tag |
| System information block type 3 | Cell | Value tag |
| System information block type 4 | Cell | Value tag |
| System information block type 5 and 5bis | Cell | Value tag |
| System information block type 6 | Cell | Value tag |
| System information block type 7 | Cell | Expiration timer = MAX(32, SIB_REP * ExpirationTimeFactor) |
| System information block type 8 | Cell | Value tag |
| System information block type 9 | Cell | Expiration timer = SIB_REP |
| System information block type 10 | Cell | Expiration timer = SIB_REP |
| System information block type 11 | Cell | Value tag |
| System information block type 12 | Cell | Value tag |
| System information block type 13 | Cell | Value tag |
| System information block type 13.1 | Cell | Value tag |
| System information block type 13.2 | Cell | Value tag |
| System information block type 13.3 | Cell | Value tag |
| System information block type 13.4 | Cell | Value tag |
| System information block type 14 | Cell | Expiration timer = MAX(32, SIB_REP * ExpirationTimeFactor) |
| System information block type 15 | Cell | Value tag |
| System information block type 15.1 | Cell | Value tag |
| System information block type 15.2 | Cell | Value tag |

TABLE 2-continued

| System information block | Area scope | Modification of system information |
|---|---|---|
| System information block type 15.3 | PLMN | Value tag |
| System information block type 15.4 | Cell | Value tag |
| System information block type 15.5 | Cell | Value tag |
| System information block type 16 | Equivalent PLMN | Value tag |
| System information block type 17 | Cell | Expiration timer = SIB_REP |
| System Information Block type 18 | Cell | Value tag |

As described above, the system information with 'Area scope Cell' includes master system blocks, scheduling blocks and system information blocks 2~15.2, 15.4~15.5, and 17~18, while the system information with 'Area scope PLMN' includes system information blocks 1, 15.3, 16.

Figure 2:
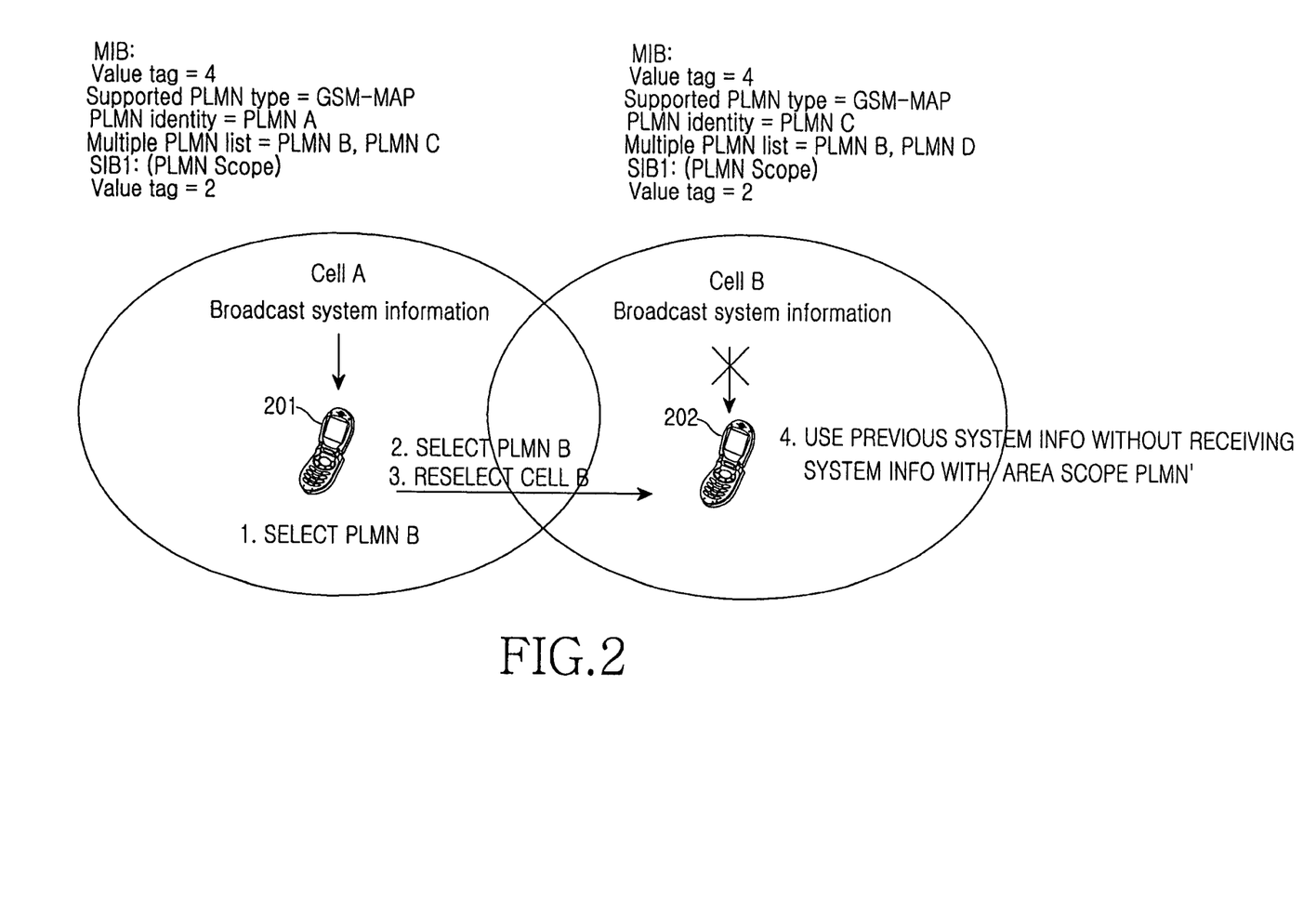
FIG. 2 is a diagram illustrating a problem occurring when a UE determines validity of broadcast system information before receiving the system information in an NS system.
Figure 3:
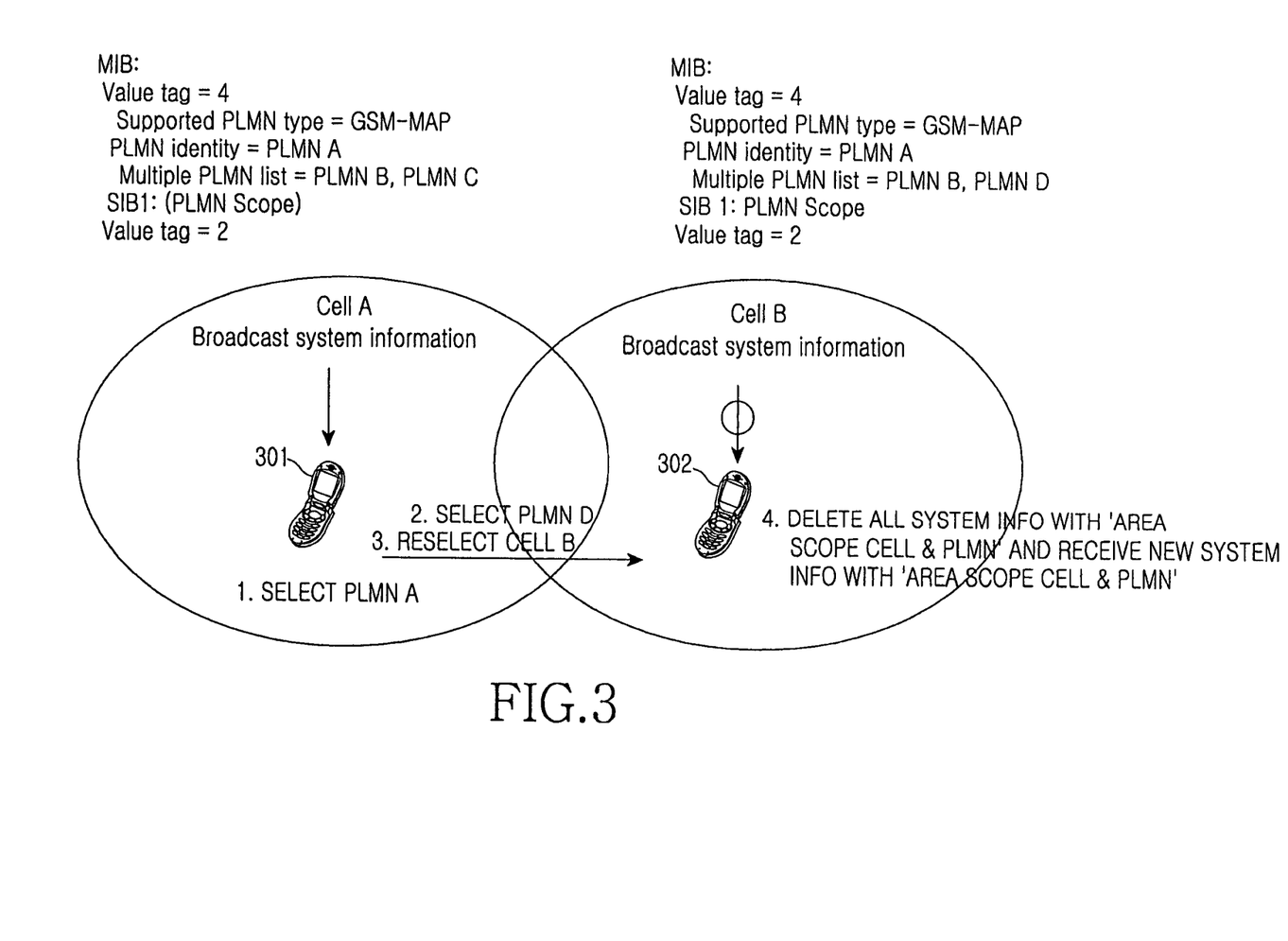
FIG. 3 is a diagram illustrating another problem occurring when a UE determines validity of broadcast system information before receiving the system information in an NS system.

In Table 2, system information blocks 7, 14 and 17 represent necessity of update using a timer instead of using the foregoing version value, and follow the area scope even though they use the timer. That is, the UE, even though it uses the timer, receives all of the corresponding system information blocks, if the UE leaves the corresponding area scope, that is, selects a new cell (for 'Area scope Cell') or a new PLMN (for 'Area scope Cell' or 'Area scope PLMN') and has no valid system information blocks for the new cell or the new PLMN, stored therein. With reference to FIGS. 2 and 3, a description will now be made of a scenario for the problem occurring when a system information receiving method for an UE, defined in a non-NS system, is applied to the NS system.

Referring to FIG. 2, a UE located in a cell A as shown by reference numeral 201 performs PLMN selection in step 1 based on PLMN information (PLMN identity=PLMN A, Multiple PLMN List=PLMN B, PLMN C) received through a MIB. The UE comprises a receiver for receiving system information blocks and a memory for storing system information. An RAN controlling the cell A belongs to a PLMN A and is given as a 'PLMN identity' of the MIB for the cell A. PLMN B and PLMN C represent the PLMNs that share the RAN for controlling the cell A, and are given as a 'Multiple PLMN List' of the MIB for the cell A. In step 1, the UE selects the PLMN B and accesses the PLMN B via the cell A. The UE, as it moves to a cell B as shown by reference numeral 202, receives PLMN information (PLMN identity=PLMN C, Multiple PLMN List=PLMN B, PLMN D) in the cell B through the MIB, and re-performs the PLMN selection. At this moment, although a PLMN D is newly applied as a PLMN sharing the cell B, the UE continues to select the PLMN B having the highest priority in step 2, and reselects the cell B in step 3.

A new RAN controlling the cell B belongs to a PLMN C, and the PLMN B and the PLMN D merely share the RAN. Therefore, the new RAN controlling the cell B broadcasts the different system information from that of the previous RAN that has controlled the cell A. As a result, the UE must clear all system information with 'Area scopes Cell and PLMN' that it received in the cell A and has kept, considering that all the system information is no longer valid regardless of the version value, and receive all system information with 'Area scopes Cell and PLMN', broadcast in the cell B.

However, according to the system information receiving method for a UE, defined in the conventional non-NS system, a UE has already selected a PLMN B in a previous cell A and selects the PLMN B even in a new cell B, so the UE uses the intact SIB previously received in the cell A, without newly receiving a SIB with 'Area scope PLMN' in the cell B like in step 4 of FIG. 2. That is, a SIB1 among the SIBs the UE has received in the cell A has an 'Area scope PLMN', and has a version value of 2. Because a version value of the SIB1 broadcast from the cell A is also 2, the UE reuses the SIB1 of the cell A, without newly receiving the SIB1 from the cell B. In this case, the UE fails to acquire correct information corresponding to the SIB1 of the cell B, and mistakes the SIB1 of the cell A for the SIB1 of the cell B. Due to the mistake, the UE does not perform location area update (LAU) and routing area update (RAU), preventing a call service from being correctly received.

FIG. 3 is a diagram illustrating another possible problem occurring during reception of system information in an NS system.

In FIG. 3, a previous RAN controlling a cell A belongs to a PLMN A, and the previous RAN is shared by a PLMN B and a PLMN C. A new RAN controlling a cell B belongs to the PLMN A and the new RAN is shared by the PLMN B and a PLMN D.

A UE located in the cell A as shown by reference numeral 301 selects a PLMN A among the PLMN A, the PLMN B and the PLMN C in step 1, as a result of PLMN selection. This is because the PLMN A has the highest priority. However, the UE, after moving to the cell B as shown by reference numeral 302, selects a PLMN D among the PLMN A, the PLMN B and the PLMN D in step 2. This is because for the UE, the PLMN D is higher than the PLMN A in priority. In FIG. 3, because the RAN of the cell B, like the RAN of the cell A, belongs to the PLMN A, the UE is not required to newly receive the system information with an 'Area scope PLMN' and the same version value, like the SIB1. Therefore, the UE can reuse the system information, regarding that the system information that it received in the cell A and has kept is valid.

However, according to the system information receiving method for a UE, defined in the conventional non-NS system, a UE has selected a PLMN A in a cell A and selects a PLMN D in a cell B, so the UE resets (clears) all system information with 'Area scopes Cell and PLMN' that it received in the cell A and has kept, considering that all the system information is no longer valid, and receives and stores all system information with 'Area scopes Cell and PLMN', broadcast in the cell B. That is, although the UE is not actually required to receive the SIB1 in the cell B and can use the SIB1 that it received in the cell A and has kept, the UE receives the SIB1 in the cell B and re-updates the SIB1, decreasing the efficiency.

In order to address this problem, an exemplary implementation of the present invention defines a UE operation of determining validity of system information before receiving the system information in the NS system. When a UE operation defined in the non-NS system is applied in the NS system, the UE checks validity of system information with 'Area scope PLMN' having the same version value depending on whether a PLMN that it selected in a new cell is equal to or different from a PLMN that it selected in a previous cell, and receives the system information in the new cell according to the check result, thereby causing the problems described with reference to FIGS. 2 and 3.

An exemplary embodiment of the present invention provides a method for allowing a UE to check a PLMN to which a RAN controlling a new cell belongs, rather than a PLMN selected by the UE, before receiving system information of the new cell according to the check result, in the process of receiving system information with 'Area scope PLMN' in an NS system.

A UE receives and keeps a PLMN identity indicating a PLMN to which an RAN controlling the current cell belongs, through a MIB, and checks a PLMN identity indicating a PLMN to which a RAN controlling a new cell belongs when it moves to the new cell. If the two PLMN identities are different from each other, the UE newly receives system information with 'Area scopes Cell and PLMN' in a new cell. If the UE has already stored therein the valid system information for the PLMN to which the RAN controlling the new cell belongs, it may reuse the stored system information.

If the two PLMN identities are different from each other, the UE deletes the system information with 'Area scopes Cell and PLMN' that it received in the previous cell and has kept, considering that the system information is no longer valid. Alternatively, the UE stores the system information so as to use it after returning to the previous cell, or to use in another cell or another PLMN.

Figure 4:
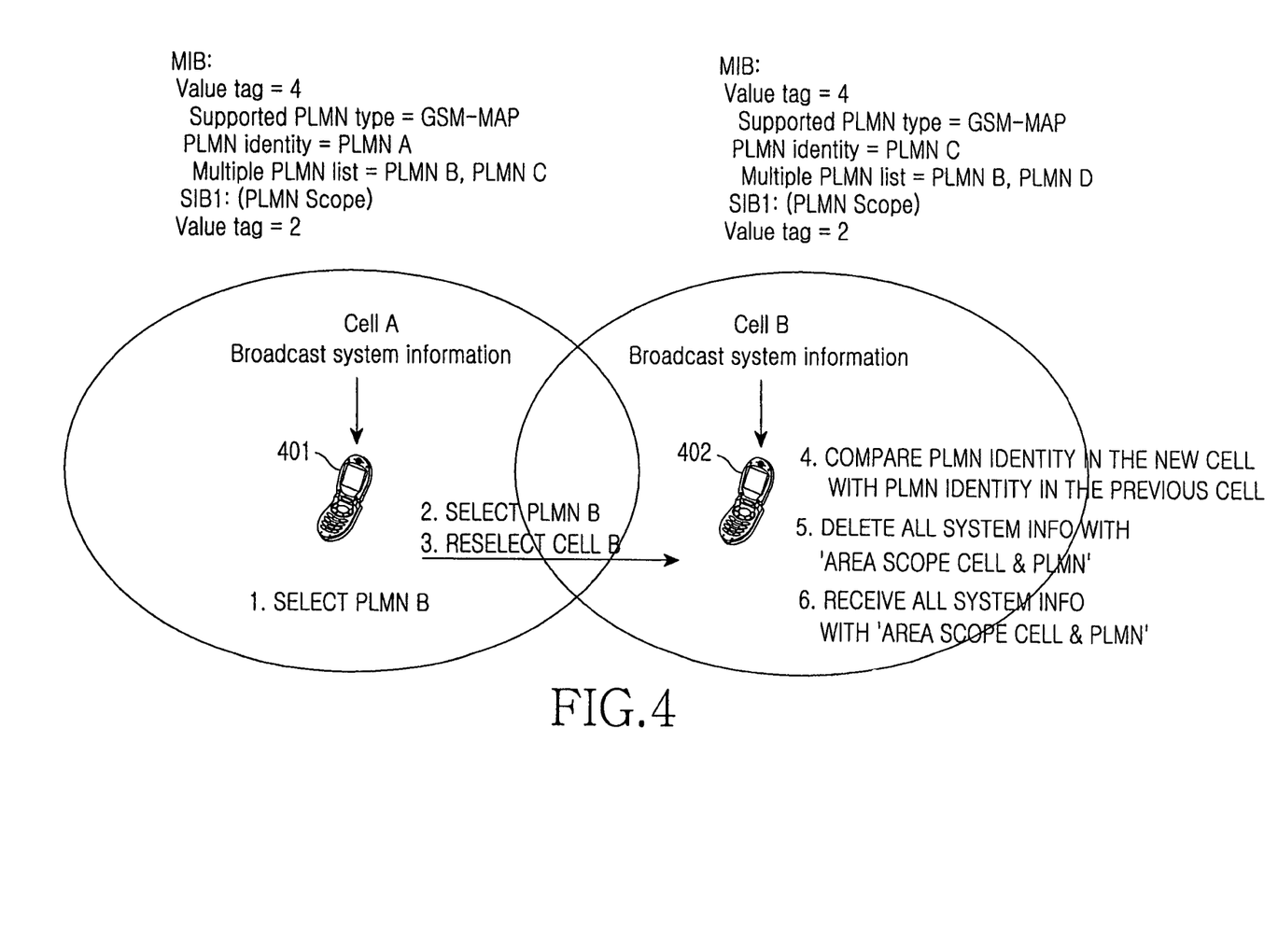
FIG. 4 is a diagram illustrating an operation of allowing a UE to determine validity of broadcast system information before receiving the system information in an NS system according to a first exemplary embodiment of the present invention.

FIG. 4 is a diagram illustrating an operation of allowing a UE to determine validity of broadcast system information before receiving the system information in an NS system according to a first exemplary embodiment of the present invention.

FIG. 4 illustrates an operation for addressing the problem described with reference to FIG. 2. A MIB and a SIB1 broadcast in each of a cell A and a cell B have been described with reference to FIG. 2. In step 1, a UE located in the cell A as shown by reference numeral 401 selects a PLMN B, as a result of PLMN selection. At this moment, the UE receives and stores a PLMN identity indicating a PLMN A to which a RAN controlling the cell A belongs, regardless of the selected PLMN B. The PLMN identity of the cell A is given through a MIB of the cell A. The UE, after moving to the cell B as shown by reference numeral 402, selects the PLMN B in step 2, and reselects the cell B in step 3. In step 4, the UE receives a PLMN identity indicating a PLMN C to which a RAN controlling the cell B belongs, through a MIB of the cell B, and checks whether the PLMN C to which the RAN controlling the cell B belongs is equal to or different from a PLMN A to which a RAN controlling the cell A belongs.

In FIG. 4, because the PLMN C controlling the cell B is different from the PLMN A controlling the cell A, the UE deletes, in step 5, all system information with 'Area scopes Cell and PLMN' that it received in the cell A and has kept, considering that all the system information is not valid. In step 6, the UE receives all system information with 'Area scopes Cell and PLMN' in the cell B.

Figure 5:
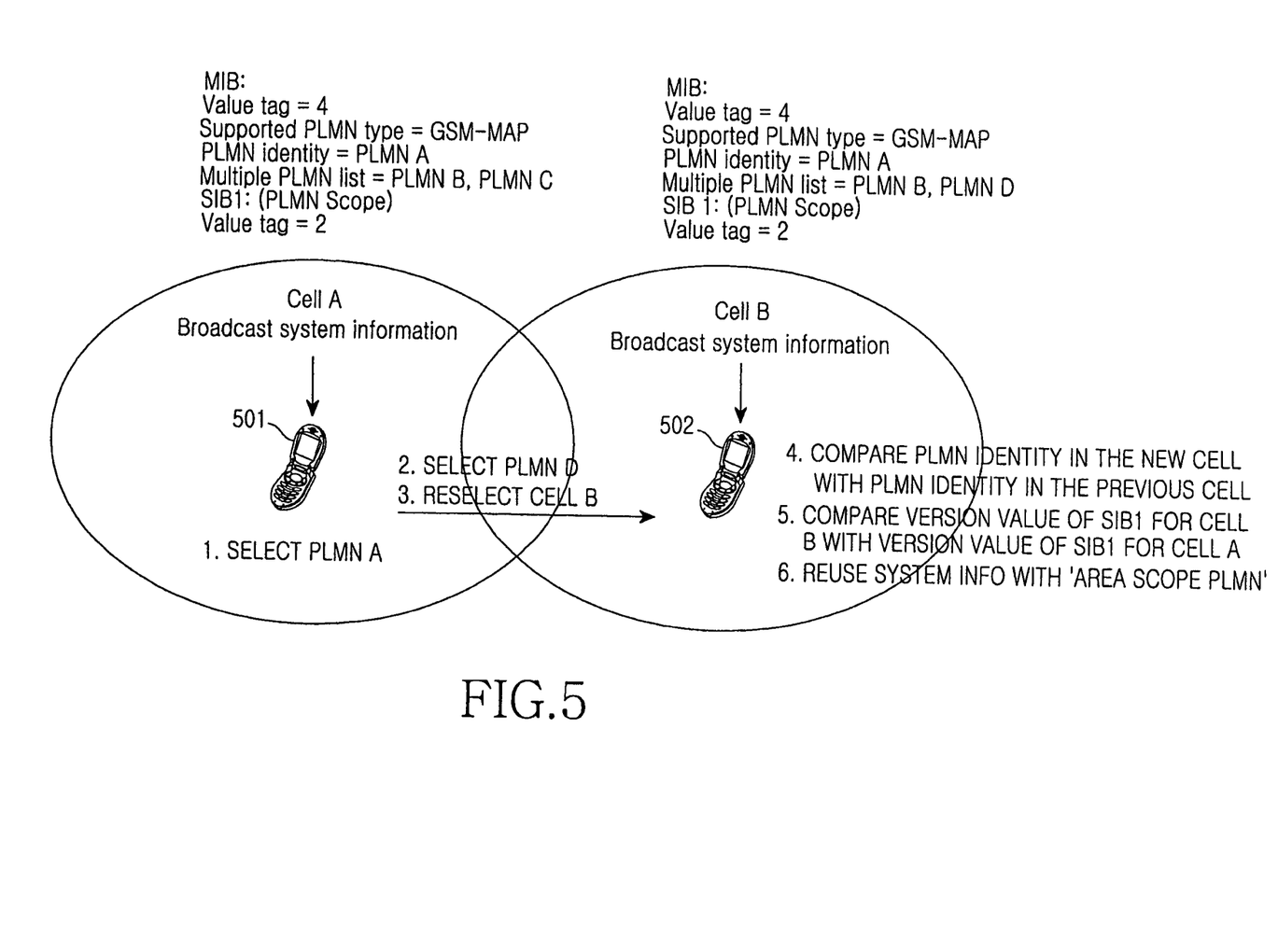
FIG. 5 is a diagram illustrating an operation of allowing a UE to determine validity of broadcast system information before receiving the system information in an NS system according to a second exemplary embodiment of the present invention.

FIG. 5 is a diagram illustrating an operation of allowing a UE to determine validity of broadcast system information before receiving the system information in an NS system according to a second exemplary embodiment of the present invention.

FIG. 5 illustrates an operation for addressing the problem described with reference to FIG. 3. A MIB and a SIB1 broadcast in each of a cell A and a cell B have been described with reference to FIG. 3. In step 1, a UE located in the cell A as shown by reference numeral 501 selects a PLMN A, as a result of PLMN selection. At this moment, the UE receives and stores a PLMN identity indicating the PLMN A to which a RAN controlling the cell A belongs, regardless of the selected PLMN A. The PLMN identity indicating the PLMN A to which the RAN controlling the cell A originally belongs is given through a MIB of the cell A. The UE, after moving to the cell B as shown by reference numeral 502, selects a PLMN D in step 2, and reselects the cell B in step 3. In step 4, the UE receives a PLMN identity indicating a PLMN A to which a RAN controlling the cell B belongs, through a MIB of the cell B, and checks whether the PLMN A to which the RAN controlling the cell B belongs is equal to or different from a PLMN A to which a RAN controlling the cell B belongs.

In FIG. 5, because both the cell A and the cell B are controlled by the PLMN A, the UE compares system information with 'Area scope PLMN' of the cell B, for example, a version value of the SIB1, with a version value of the system information of the cell A in step 5. If the two version values are equal to each other, the UE reuses the corresponding system information of the cell A without the need to receive the system information with 'Area scope PLMN' in the cell B in step 6. If, however, the two version values are different from each other, the UE receives the system information in the cell B, considering that the corresponding system information of the cell A is invalid. In the case of FIG. 5, because the version value of the SIB1 of the cell B and the version value of the SIB1 of the cell A are both equal to 2, the UE reuses the SIB1 of the cell A without the need to receive the SIB1 in the cell B.

Figure 6:
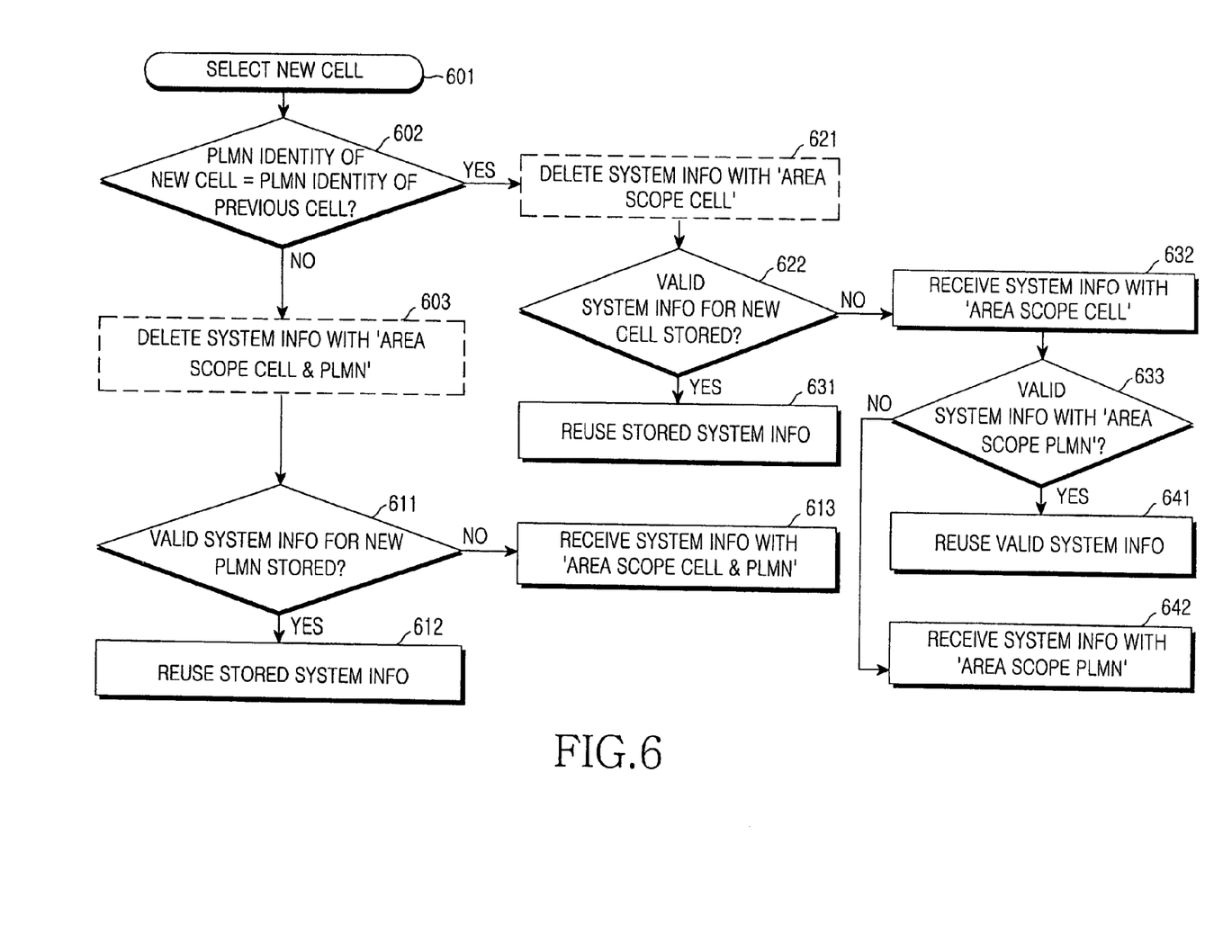
FIG. 6 is a flowchart illustrating a UE operation of determining validity of broadcast system information before receiving the system information in an NS system according to another exemplary embodiment of the present invention.

FIG. 6 is a flowchart illustrating an operation of a UE according to an exemplary embodiment of the present invention.

A UE indicates its selection of a new cell in step 601. The UE checks in step 602 whether a PLMN identity included in a MIB of the new cell is equal to a PLMN identity of a previous cell.

If it is determined in step 602 that the PLMN identities are different from each other, the UE deletes system information with 'Area scopes Cell and PLMN' of the previous cell in step 603, considering that all the system information is no longer valid. In this case, the UE deletes or keeps the system information with 'Area scopes Cell and PLMN' of the previous cell. The UE checks in step 611 whether it has already stored valid system information for the PLMN identity of the new cell. That is, the UE checks a version value of the previously stored system information with a version value of the master system information of the new cell, and determines that the system information is valid if the version values are equal to each other.

If it is determined in step 611 that the UE has already stored valid system information for the PLMN identity of the new cell, the UE reuses the stored system information as system information of the new cell in step 612. However, if the UE has no valid system information for the PLMN identity of the new cell, the UE receives and stores system information with 'Area scopes Cell and PLMN' in the new cell in step 613, and uses it in the new cell.

However, if it is determined in step 602 that the PLMN identity included in the MIB of the new cell is equal to the PLMN identity of the previous cell, the UE considers in step 621 that system information with 'Area scope Cell' of the previous cell is no longer valid. Similarly, the UE deletes or keeps the system information with 'Area scope Cell' of the previous cell in step 621. The UE checks in step 622 whether it has already stored valid system information for the new cell.

If the UE has already stored valid system information for the new cell, it reuses the stored system information as system information of the new cell in step 631. However, if the UE has no valid system information previously stored therein, it receives and stores the system information with 'Area scope Cell' in the new cell in step 632, and uses it in the new cell. Thereafter, the UE checks in step 633 whether system information with 'Area scope PLMN' received in the previous cell is valid. The validity can be checked through a version value of the system information with 'Area scope PLMN'. If it is determined in step 633 that the system information is valid, that is, if a version value of the system information with 'Area scope PLMN' of the previous cell is equal to a version value for the new cell, the UE reuses the valid system information in step 641. However, if the system information is invalid in step 633, the UE receives and stores system information with 'Area scope PLMN' in step 642, and uses it in the new cell.

As can be understood from the foregoing description, an exemplary embodiment of the present invention allows a UE to determine validity of system information before receiving the system information, thereby preventing unnecessary re-reception or re-update of the system information due to its inter-cell movement. The prevention of the unnecessary re-reception or re-update of the system information facilitates an efficient operation.

While the invention has been shown and described with reference to a certain exemplary embodiment thereof, it will be understood by those skilled in the art that various changes in form and details may be made therein without departing from the spirit and scope of the invention as defined by the appended claims, including the full scope of equivalents thereof.

What is claimed is:

1. A method for receiving system information during inter-cell movement of a user equipment (UE) in a network sharing (NS) system, the method comprising the steps of:
    moving, by a UE, from a previous cell to a new cell;
    comparing a first public land mobile network (PLMN) identity indicating a first PLMN to which the previous cell belongs, with a second PLMN identity indicating a second PLMN to which the new cell belongs;
    setting first system information blocks received and stored by the UE in the previous cell as second system information of the new cell if the second PLMN identity is equal to the first PLMN identity; and
    receiving second system information blocks from the new cell if the second PLMN identity is not equal to the first PLMN identity, wherein first system information of the previous cell is considered to be invalid in the new cell.

2. The method of claim 1, wherein the setting step comprises the steps of:
    determining whether the first system information blocks comprising first 'Area scope PLMN' are valid in the new cell, if the second PLMN identity is equal to the first PLMN identity;
    setting the first system information blocks comprising the first 'Area scope PLMN' of the previous cell as the second system information for the new cell, if the first system information blocks are valid in the new cell; and
    receiving second system information blocks comprising second 'Area scope PLMN' from the new cell if the first system information blocks are invalid in the new cell.

3. The method of claim 2, wherein the determining step further comprises the step of comparing a first version value received through a master information block (MIB) of the previous cell with a second version value received through a master information block of the new cell, and determining that the first system information of the previous cell is valid in the new cell, if the first version value is equal to the second version value.

4. The method of claim 2, wherein the setting step further comprises the steps of:
    determining whether the first system information blocks stored by the UE are valid for the new cell, if the second PLMN identity is equal to the first PLMN identity, wherein the first system information blocks comprising the first 'Area scope Cell' in the first system information are considered to be invalid in the new cell;
    setting the first system information blocks as the second system information for the new cell, if the first system information blocks stored by the UE are valid for the new cell; and
    receiving the second system information blocks comprising the second 'Area scope Cell' from the new cell, if the first system information blocks stored by the UE are not valid for the new cell.

5. The method of claim 1, wherein the receiving step comprises the steps of:
    determining whether the first system information blocks stored by the UE are valid for the new cell, if the second PLMN identity is not equal to the first PLMN identity;
    setting the first system information blocks as the second system information for the new cell, if first system information blocks stored by the UE are valid for the new cell; and
    receiving the second system information blocks comprising the second 'Area scopes Cell and PLMN' from the new cell, if first system information blocks stored by the UE are not valid for the new cell.

6. A network sharing (NS) system comprising:
    at least one radio access network (RAN) for covering a plurality of cells, and broadcasting a public land mobile network (PLMN) identity indicating a PLMN to which each cell belongs and a multiple PLMN list indicating PLMNs sharing each cell, through each cell; and
    a user equipment (UE) comprising:
        a receiver for receiving system information blocks; and
        a memory for storing system information;
    wherein the UE is configured to compare a first PLMN identity of a previous cell with a second PLMN identity of a new cell if the UE moves from the previous cell to the new cell, wherein the plurality of cells comprise the previous cell;
    first system information blocks received by the receiver in the previous cell and stored in the memory are set as second system information for the new cell, if the second PLMN identity is equal to the first PLMN identity; and
    second system information blocks from the new cell are received by the receiver, if the second PLMN identity is not equal to the first PLMN identity, wherein first system information of the previous cell is considered to be invalid in the new cell.

7. The NS system of claim 6, wherein:
    whether the first system information blocks comprise 'Area scope PLMN' are valid in the new cell is determined, if the second PLMN identity is equal to the first PLMN identity;
    the first system information blocks comprising first 'Area scope PLMN' of the previous cell are set as the second system information for the new cell, if the first system information blocks are valid in the new cell; and second system information blocks comprising second 'Area scope PLMN' from the new cell are received, if the first system information blocks are invalid in the new cell.

8. The NS system of claim 7, wherein:

a first version value received through a master information block (MIB) of the previous cell is compared with a second version value received through a master information block of the new cell; and the first system information of the previous cell is determined to be valid in the new cell, if the first version value is equal to the second version value.

9. The NS system of claim 7, where:

whether the first system information blocks stored in the memory are valid for the new cell is determined, if the second PLMN identity is equal to the first PLMN identity, the first system information blocks comprising the first 'Area scope Cell' in the first system information of the previous cell being considered invalid in the new cell;

the first system information blocks stored in the memory are set as the second system information for the new cell, if the first system information blocks stored in the memory are valid for the new cell; and the second system information blocks comprising the second 'Area scope Cell' from the new cell are received, if the first system information blocks stored in the memory are not valid for the new cell.

10. The NS system of claim 6, wherein:

whether the first system information blocks stored in the memory are valid for the new cell is determined, if the second PLMN identity is not equal to the first PLMN identity;

the first system information blocks stored in the memory are set as the second system information for the new cell, if first system information blocks stored in the memory are valid for the new cell; and the second system information blocks comprising the second 'Area scopes Cell and PLMN' from the new cell are received, if first system information blocks stored by the UE are not valid for the new cell.

* * * * *